United States Patent [19]

Gerson et al.

[11] Patent Number: 4,870,686
[45] Date of Patent: Sep. 26, 1989

[54] METHOD FOR ENTERING DIGIT SEQUENCES BY VOICE COMMAND

[75] Inventors: Ira A. Gerson, Hoffman Estates; Brett L. Lindsley, Palatine, both of Ill.

[73] Assignee: Motorola, Inc., Schaumburg, Ill.

[21] Appl. No.: 110,144

[22] Filed: Oct. 19, 1987

[51] Int. Cl.$^4$ ............................................. G10L 5/06
[52] U.S. Cl. ...................................... 381/43; 379/355
[58] Field of Search ............................ 381/36, 41, 43; 364/513.5; 379/354–356

[56] References Cited

U.S. PATENT DOCUMENTS

| | | | |
|---|---|---|---|
| 3,742,143 | 6/1973 | Awipi ...................................... | 381/43 |
| 3,928,724 | 12/1975 | Byram et al. ....................... | 179/1 SD |
| 4,049,913 | 9/1977 | Sakoe ................................. | 179/1 SD |
| 4,336,421 | 6/1982 | Welch et al. ....................... | 179/1 SD |
| 4,348,550 | 9/1982 | Pirz et al. ........................... | 381/43 |
| 4,426,733 | 1/1984 | Brenig ................................ | 455/79 |
| 4,513,189 | 4/1985 | Ueda et al. ........................ | 219/10.55 |
| 4,525,793 | 6/1985 | Stackhouse ........................ | 364/513 |
| 4,528,687 | 7/1985 | Noso et al. ........................ | 381/43 |
| 4,573,187 | 2/1986 | Bui et al. ........................... | 381/43 |
| 4,593,157 | 6/1986 | Usdan ............................... | 179/90 BD |
| 4,593,403 | 6/1986 | Kishi et al. ........................ | 381/43 |
| 4,614,839 | 9/1986 | Umebayashi ...................... | 179/2 E |
| 4,624,008 | 11/1986 | Vensko et al. .................... | 381/43 |
| 4,644,107 | 2/1987 | Clowes et al. .................... | 379/355 |
| 4,731,811 | 3/1988 | Dubus ................................ | 379/58 |
| 4,737,976 | 4/1988 | Borth et al. ....................... | 379/58 |

FOREIGN PATENT DOCUMENTS

0041195 6/1981 European Pat. Off. .
0177854 9/1985 European Pat. Off. .

OTHER PUBLICATIONS

Borth, et al., co-pending U.S. patent application Ser. No. 06/816,034, filing date Jan. 3, 1986, entitled "Method and Apparatus for Synthesizing Speech from Speech Recognition Templates Without Voicing or Pitch Information", (CM00249G).

Crump, Stuart, Jr., "The Industries First Voice-Dialed Cell Phone is Due by Next April", *Personal Communications Technology*, (Dec. 1985), pp. 34–35.

Kitsopoulos, et al., "Experimental Telephone Lets Disabled Dial by Voice", *Bell Laboratories Record*, (Oct. 1973), pp. 272–277.

Martin, Thomas B., "Practical Applications of Voice Input to Machines", *Proc. IEEE*, vol. 64, No. 4, (Apr. 7, 1976,) pp. 487–501.

*Primary Examiner*—William M. Shoop, Jr.
*Assistant Examiner*—Marc S. Hoff
*Attorney, Agent, or Firm*—Charles L. Warren; Donald B. Southard

[57] ABSTRACT

A user-interactive speech recognition control system is disclosed for recognizing a complete sequence of keywords (e.g., a telephone number such as 123-4567) via entering, verifying, and editing variable-length utterance strings (e.g., 1-2-3; 4-5; 6-7) separated by the user-defined placement of pauses. The device controller (120) utilizes timers (124) to monitor the pause time between partial-sequence digit strings recognized by the speech recognizer (110). When a string of digits is followed by a predetermined pause time interval, the recognized digits will be replied via the speech synthesizer (130). An additional string of digits can then be entered, and only the subsequent string will be replied after the next pause. Furthermore, the user has the flexibility to correct only the last digit string entered, or the entire sequence. Hence, if there is an error in only one digit, the erroneous digit string can be corrected without having to re-enter the entire digit sequence. The invention is well-suited to be used in a hands-free voice command dialing system for a mobile radiotelephone, wherein vehicular background noise may affect recognition accuracy.

34 Claims, 3 Drawing Sheets

METHOD FOR ENTERING DIGIT SEQUENCES BY VOICE COMMAND

BACKGROUND OF THE INVENTION

1. Field of the Invention

The present invention generally relates to speech recognition control systems. More particularly, the present invention relates to a hands-free voice command automatic dialing system especially suited for use in a noisy environment such as encountered in vehicular radiotelephone applications.

2. Description of the Prior Art

Typically, in both radio and landline telephone systems, the user communicates by means of a handset that includes a speaker at one end, which is placed close to the user's ear, and a microphone at the other end, which is held close to the user's mouth. In operation, one hand of the user is occupied holding the handset in its proper orientation, thereby leaving the user's only free hand to accomplish tasks such as driving a vehicle. In order to provide a greater degree of freedom for the user, speakerphones have commonly been used in landline telephone systems. Recently, vehicular speakerphones have been developed for use in automobiles. For example, U.S. Pat. Nos. 4,378,603 by Eastmond and 4,400,584 by Vilmur, both assigned to the same assignee as the present invention, describe vehicular speakerphones with hands-free operation.

Speech recognition control systems, which are responsive to human voice, are highly desirable for use in automotive applications. Most mobile radio transceiver functions (e.g., on/off, transmit/receive, volume, squelch, etc.) or mobile radiotelephone control functions (e.g., pushbutton dialing, speech recognizer training, telephone call answering) may readily be achieved by voice command without requiring any manual operations. Hence, the use of speech recognition with a vehicular speakerphone has the potential for providing a totally hands-free telephone conversation without ever requiring the automobile driver to remove his hands from the steering wheel or take his eyes off the road. This feature has not only extended the hands-free capability of speakerphones, but also has added to the safety and convenience of using mobile radiotelephones in vehicles.

Unfortunately, the application of complete hands-free control to a mobile radiotelephone introduces several significant obstacles When speech recognition is utilized in a vehicular environment, the high degree of ambient noise inherent in a vehicle presents a considerable obstacle to reliable voice control. Furthermore, a vehicular speakerphone typically has a microphone that is distant from the user's mouth, such as being mounted overhead on the automobile sun visor. Consequently, the required high microphone sensitivity causes a large increase in the amount of environmental background noise being applied to the speech recognizer, which degrades its recognition reliability.

More particularly, the problem of speech recognition errors in an automatic dialing telephone considerably inhibits the performance of the system. The features of automatic and repertory dialing have recently been utilized in cellular telephone applications, such that the user can verbally enter telephone digits or verbally recall prestored numbers with predefined keywords. If the speech recognition unit erroneously recognizes a command keyword, the voice command controller will generally reply the command recognized to the user for verification purposes. The user would then re-enter the correct keyword. This entry/verification/re-entry process is usually only a minor inconvenience, since it typically takes only a few seconds for the majority of commands. However, if the speech recognizer erroneously detects a single digit in a lengthy sequence of digits representing a telephone number, the entry/verification/re-entry process becomes tremendously time consuming and, at the very least, considerably frustrating to the user.

For these reasons, the prior art techniques for entering digits by voice command have been severely limited. Some voice recognition controllers wait for the user to utter a predetermined number of digits, e.g., seven or eleven for a telephone number. Upon recognition of the last expected digit, the controller utilizes speech synthesis to verbally reply the number recognized to the user for verification. The user can then prevent entry of an erroneously recognized telephone number by speaking a predetermined error command keyword. However, in vehicular environments where the recognition accuracy is not high, it may take several repetitions of the entire digit sequence for correct recognition. In other versions, the voice command dialer will repeat every single digit immediately after recognition. Although this alternative may prove more reliable in a high noise environment, it needlessly requires a considerable amount of time to enter a lengthy string of digits, especially when the recognition accuracy is high. Moreover, the single digit verification process is very annoying when a digit is incorrectly recognized, since the user can easily forget the next digit to be entered when he must mentally stop to say an error command, repeat the incorrect single digit, listen to the corrected reply, and then continue. On the whole, the prior art digit entry/verification procedures have not been user-friendly.

A need, therefore, exists for an intelligent method for entering and verifying a sequence of digits by voice command in a speech recognition control system.

SUMMARY OF THE INVENTION

Accordingly, it is a general object of the present invention to provide an improved method and apparatus for entering and verifying a string of keywords by speech recognition.

A more particular object of the present invention is to provide an improved user-interactive speech recognition control system for dialing a telephone via entering and selectively editing partial-sequence digit strings.

In accordance with the present invention, a user-interactive voice command control system for a speech communications device is provided which reliably enters a complete sequence of user-spoken utterances, such as an eleven-digit telephone number. The voice command control system includes a speech recognition unit which recognizes a plurality of partial-sequence variable-length strings of user-spoken utterances as corresponding to a plurality of predetermined keywords, such as digits The control system provides a pause signal after the first utterance string has ceased for predetermined pause time interval, and then provides an indication to the user of the keywords which were recognized in response to the first utterance string. The control system also provides a mechanism for correcting particular keywords in response to the pause signal and in response to the recognition of a second utterance string corresponding to a predetermined error command keyword.

In the preferred embodiment, the hands-free user-interactive voice command dialing system is used with a mobile radiotelephone employing a vehicular speakerphone. When a predetermined pause time interval is recognized after a string of digits, the recognized digits will be replied by the system. An additional string of digits can then be entered, and only the subsequent digit string recognized will be replied after the next pause. If an error command keyword (such as the word "CLEAR") is then recognized, only the last string of digits entered will be cleared. If the error command word is recognized twice consecutively, the entire string of digits will be cleared. If the controller detects that the user is speaking but nothing is being recognized, the system responds (perhaps with the word "REPEAT") to indicate to the user that the speech recognizer could not recognize the previous string and that it should be repeated. Upon entry of the final digit string, the user speaks a stop command (such as the word "TERMINATE") and the complete sequence of recognized digits is replied and output to the radiotelephone.

In this manner, the user has the flexibility to alter the verification mode of the recognition process in response to environmental noise conditions. In an environment where high recognition accuracy is expected, the user can enter the entire digit sequence without pauses, and the system would immediately confirm and store the complete sequence. Alternatively, under high background noise conditions, the user has the option of requesting verification of partial-sequence digit strings by pausing after each string is uttered. If there is a recognition error, the particular digit string can be corrected without having to re-enter the entire digit sequence. The instant method of verifying keyword strings after each pause is also very user-friendly, since people naturally read, memorize, and speak lengthy digit sequences (e.g., long distance telephone numbers) in predefined groups of digit strings (e.g., 1-312-397-1000).

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in which:

DETAILED DESCRIPTION OF THE PREFERRED EMBODIMENT

Figure 1:
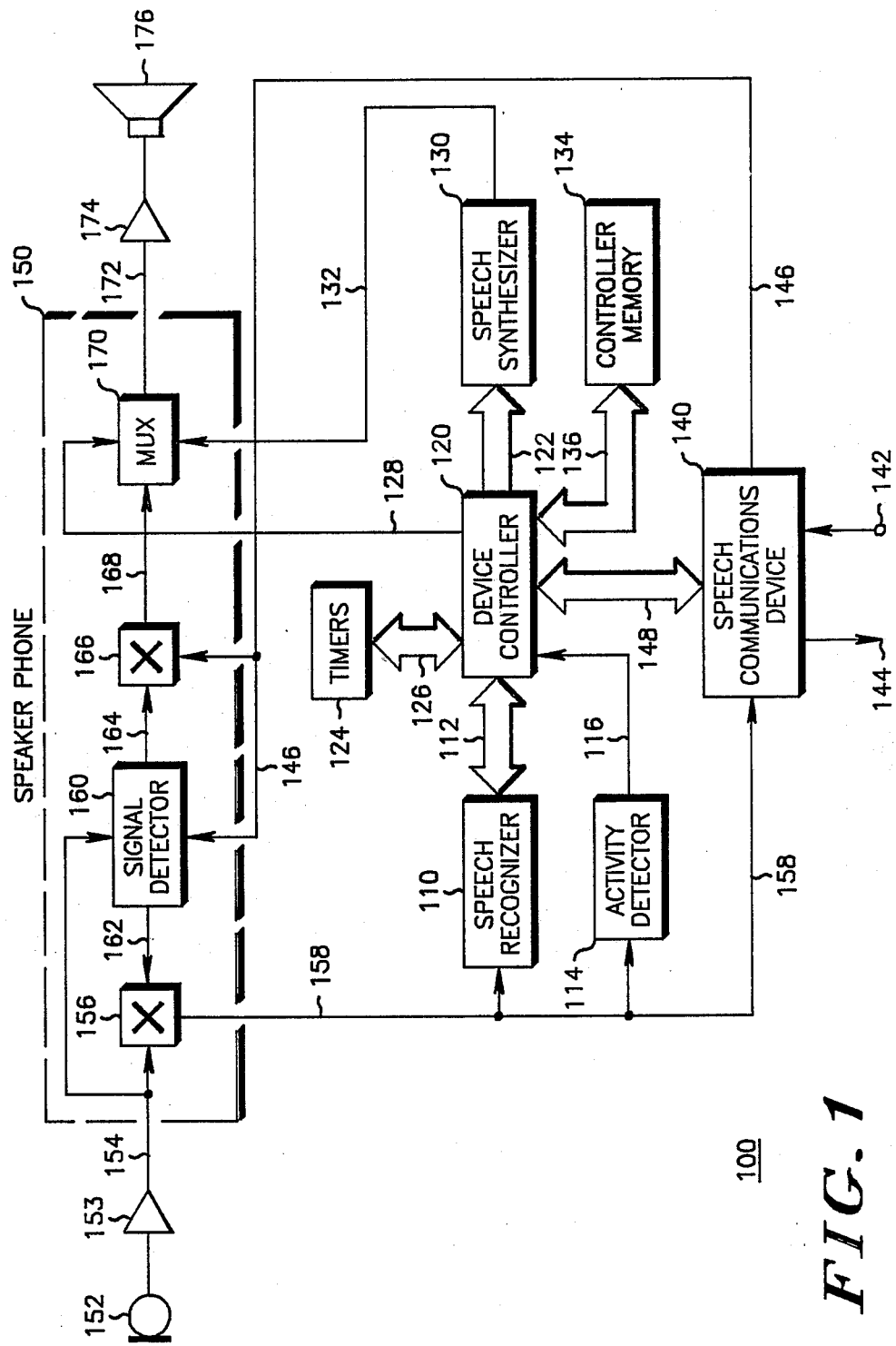
FIG. 1 is a block diagram of a voice command control system for a speech communications device employing the digit entry method according to the present invention.

Referring now to the accompanying drawings, FIG. 1 shows a general block diagram of user-interactive control system 100 of the present invention. The system is basically comprised of device controller 120 connected to speech communications device 140 Speech recognizer 110 is coupled to the device controller so as to interpret verbal commands from the user into command signals for the system. The device controller monitors the information from the speech recognizer as well as from timers 124, activity detector 114, and controller memory 134. The controller has the ability to select recognition templates and enable speech recognizer 110, reset the timers, store data into and read data from controller memory 134, control the dialing operation of the speech communications device, and provide information to speech synthesizer 130 to provide feedback to the user. The system is well-suited for use with a speakerphone, such that the user's hands are free to perform other tasks. Speakerphone 150 controls the direction of the audio paths to provide this hands-free feature.

Speech communications device 140 may include portions of any radio or landline voice communication system, such as, for example, two-way radio systems, telephone systems, intercom systems, voice data entry systems, etc. In the present embodiment, speech communications device 140 is a radiotelephone transceiver, such as a cellular mobile radiotelephone. A detailed explanation of such a radiotelephone may be found in Motorola Instruction Manual 68P81066E40 entitled, "DYNA T.A.C. ®. Cellular Mobile Telephone." However, any landline telephone or simplex radio transceiver requiring voice control may be used. Moreover, any electronic device warranting hands-free user-interactive operation may also take advantage of the present invention.

Speech communications device 140 utilizes transmit path 144 and receive path 142 to interface transmit/receive audio and dialing information to the communications channel. In the preferred embodiment of a mobile radiotelephone, these paths may interface to a pair of radio frequency (RF) channels for duplex radiotelephone operation.

Speech recognizer 110 performs speech recognition upon the input speech signal at line 158. During recognition, speech recognizer 110 compares previously stored word templates against the input speech information. The recognition algorithm of the present embodiment incorporates continuous speech recognition, dynamic time warping, energy normalization, and a Chebyshev distance metric to determine a template match. Prior art recognition algorithm, such as described in J. S. Bridle, M. D. Brown and R. M. Chamberlain, "An Algorithm for Connected Word Recognition," *IEEE International Conference on Acoustics, Speech, and Signal Processing*, (May 3–5, 1982), vol. 2, pp. 899–902, may also be used.

In the present embodiment, an eight-bit microcomputer performs the function of speech recognizer 110. Moreover, several other control system blocks of FIG. 1 are implemented in part by the same microcomputer with the aid of a CODEC/FILTER and a DSP (digital signal processor) Representative speech recognition hardware which may be used to perform the function of block 110 is described in the article by J. Peckham, J. Greene, J. Canning, and P. Stevens, entitled "A Real-Time Hardware Continuous Speech Recognition System," *IEEE International Conference on Acoustics Speech, and Signal Processing*, (May 3–5, 1982), Vol. 2, pp. 863–866, and the references contained therein However, the present invention is not limited to any specific hardware or any specific type of speech recognition More particularly, the present invention contemplates the use of speaker dependent or speaker independent voice recognition, isolated or continuous word recognition, and software-based or hardware-based implementation.

Device controller 120 is typically a microprocessor which interfaces between speech communications device 140, speech recognizer 110, and speech synthesizer 130. Device controller 120 translates device control data 112 provided by speech recognizer 110 into control signals that can be recognized by the particular speech communications device. These control signals direct the device to perform specific operating functions as instructed by the user. For example, if a user-spoken utterance corresponds to a predefined telephone number sequence, device controller 120 would produce the proper dialing signals via controller bus 148. Controller 120 may also perform voice command control of other features of speech communications device 140, such as: unlocking the control head; call answering; or any number of other operational functions.

Device controller 120 also provides device status data 122 representing the operating status of speech communications device 140. This data is applied to speech synthesizer 130, and translated into user-recognizable speech when output via speaker 176. For example, when a user-spoken utterance corresponds to a predefined command keyword for terminating the digit sequence, speech synthesizer 130 would synthesize the recognized telephone number as a reply to the user. Status data 122 may also include information as to names and telephone numbers ("Office", "555-1234", etc.), speech recognition response information ("Ready", "Terminate?", etc.), or radiotelephone status information ("Call Dropped", "System Busy", etc.).

In the present embodiment, a 19-channel vocoder is used as speech synthesizer 130. An example of such a vocoder may be found in J. N. Holmes, "The JSRU Channel Vocoder", *IEE Proc.*, Vol. 127, Pt. F, No. 1, Feb. 1980), pp. 53-60. However, as will be apparent to those skilled in the art, any speech synthesis apparatus may be utilized. Furthermore, the present invention contemplates that any means of providing an indication to the user would perform the basic reply function of the speech synthesizer block 130. For example, any visual indicator (e.g., LED, LCD, CRT, etc.) or audible indicator (e.g., tone generator or other audible signal generator) may be substituted Moreover, in the preferred embodiment, a fourteen-digit telephone number display constantly provides an additional indication to the user of the digits currently recognized.

Controller memory 134, typically random access memory (RAM), stores the plurality of keywords recognized by speech recognizer 110. Memory bus 136 sends information to controller memory 134 during the process of keyword entry, and provides access to the stored information by device controller 120 during the process of keyword verification. If speech recognizer 110 or speech communications device 140 incorporates internal RAM to perform the digit entry storage function, external controller memory 134 may be eliminated.

Speech activity detector 114 is an energy-based detector in the preferred embodiment Detector 114 could be replaced by a more sophisticated mechanism b utilizing information from the speech recognizer. In either case, speech activity detector 114 performs the function of monitoring input speech signal 158 for voice activity, such that device controller 120 is able to determine if there is speech present to be recognized Refer to R. J. McAulay and M. L. Malpass, "Speech Enhancement Using a Soft-Decision Noise Suppression Filter", *IEEE Trans Acoust., Speech, and Signal Processing*, Vol. ASSP-28, No. 2 (April 1980), pp 137-145, for a representative technique which could be used for detector 114.

Timer block 124 provides a measurement of the time that has expired since the previous speech activity, as well as the time that has expired since the last keyword was recognized. These time intervals may be initialized, monitored, and reset by controller 120 via data bus 126. Again, refer to the flowchart description for further details of these timers.

Speakerphone 150 performs the transmit/receive audio switching function, as well as the received/reply audio multiplexing function of the hands-free control system. User-spoken input speech is applied to microphone 152, which is typically remotely-mounted at a distance from the user's mouth (e.g., on the automobile sun visor). Microphone 152 generates an electrical input speech signal, which is then amplified by preamplifier 153, to provide input speech signal 154 to speakerphone 150. Speakerphone 150 directs the input speech signal at 154 to speech recognizer 110 via input signal line 158.

In a simplex system, when the mobile radio user is talking, signal detector 160 provides a positive control signal via detector output 162 to close transmit audio switch 156, and a negative control signal via detector output 164 to open receive audio switch 166. Conversely, when the landline party is talking, signal detector 160 provides the opposite polarity signals to close receive audio switch 166, while opening transmit audio switch 156. When the receive audio switch 166 is closed, receiver audio 146 from speech communications device 140 is routed through receive audio switch 166 to multiplexer 170 via switched receive audio output 168. Multiplexer 170 controls the audio path between voice reply audio 132 from speech synthesizer 130, and switched receive audio 168, in response to multiplex control signal 128 from device controller 120. Whenever the device controller sends information to the speech synthesizer, multiplexer signal 128 directs multiplexer 170 to route the voice reply audio to the speaker. Vehicle speakerphone audio 172 is usually amplified by audio amplifier 174 before being applied to speaker 176.

The vehicle speakerphone embodiment described herein is only one of numerous possible configurations. For example, it may be desired that speech recognizer 110 always be responsive to the mobile user's commands, whether or not the landline party is talking In such a case, input speech signal 154 would be directly connected to speech recognizer 110. Furthermore, in some communications systems, it may prove advantageous to replace audio switches 156 and 166 with variable gain devices that provide equal but opposite attenuation in response to the control signals from the signal detector. Signal detector 160 may also supply a signal to device controller 120 indicating whether the landline party or mobile user is speaking, which can then be used to prevent speech recognizer 110 from improperly recognizing speech from the landline party.

As can now be appreciated, device controller 120 is the heart of user-interactive hands-free voice command control system 100. An example of a device controller known in the art and suitable for use with the present invention is a microprocessor. The detailed operation of device controller 120 will subsequently be described in terms of a software flowchart for control system 100. However, for purposes of understanding the invention, the following example will now be used to illustrate the entry of a particular digit sequence in a noisy environment. This example clearly illustrates the features and advantages of the present invention Assume that the user desires to enter the complete digit sequence 1-2-3-4-5-6-7 into the dialing system. As used herein, a complete keyword "sequence" (e.g., 1-2-3-4-5-6-7) is comprised of one or more partial-sequence keyword "strings" (e.g., 1-2-3, 4, 5-6,7), wherein the strings are separated by a predefined pause time interval, i.e., time of no speech activity. The user would first direct the control system to a digit entry mode with a verbal command such as "ENTER". The system then replies with a synthesized response such as the word "DIGITS".

In a noisy environment, such as in an automobile, the speech recognition accuracy may at times be limited due to background noise. Hence the user may decide to enter the complete digit sequence 1-2-3-4-5-6-7 in three partial-sequence digit strings, i.e., 1-2-3; 4-5; 6-7. Note that each string can be of any length The user then speaks the utterances "ONE-TWO-THREE", and then pauses. If no keywords were recognized, no digits would appear in the display, and the control system would respond with the synthesized word "REPEAT"

Hence, the user would again utter "ONE-TWO-THREE", followed by a pause. If this digit string was incorrectly recognized as "ONE-THREE-THREE", the display would show 1-3-3, and the synthesizer would respond with the verbal confirmation "ONE-THREE-THREE". Since this is incorrect, the user would then utter the command word "CLEAR". Upon recognition of this command keyword, the system clears the most recent digit string, produces a double "BEEP" to indicate that the entire sequence has been cleared, and then blanks the display Again, the user would utter "ONE-TWO-THREE", followed by a three second pause interval If the correct digit string 1-2-3 was recognized, 1-2-3 would appear in the display, and the synthesizer would respond "ONE-TWO-THREE". The user would then continue with the utterances "FOUR-FIVE", followed by another pause. If these utterances were incorrectly recognized as 4-6 due to background noise, 1-2-3-4-6 would appear on the display, and the synthesizer would respond "FOUR-SIX". To correct this last digit string, the user would utter "CLEAR". Only the last digit string 4-6 would be cleared, and the display would again show 1-2-3. The synthesizer would then respond with a single "BEEP" o indicate to the user that only the most recent digit string has been cleared, and that previously entered strings remain in memory. Again the user would utter "FOUR-FIVE" followed by a pause. If correctly recognized, the synthesizer would respond "FOUR-FIVE", and the display would show 1-2-3-4-5.

Continuing with the sequence, the user would utter "SIX-SEVEN", followed by another pause. If correctly recognized, the entire sequence 1-2-3-4-5-6-7 would be displayed, and the synthesizer would respond with the confirmation "SIX-SEVEN", which represents the last digit string recognized Since the entire digit sequence has now been entered, the user would utter the command "TERMINATE". The synthesizer would then reply with the entire sequence "ONE-TWO-THREE-FOUR-FIVE-SIX-SEVEN". The display 1-2-3-4-5-6-7 would remain to verify the complete digit sequence.

Figure 2A:
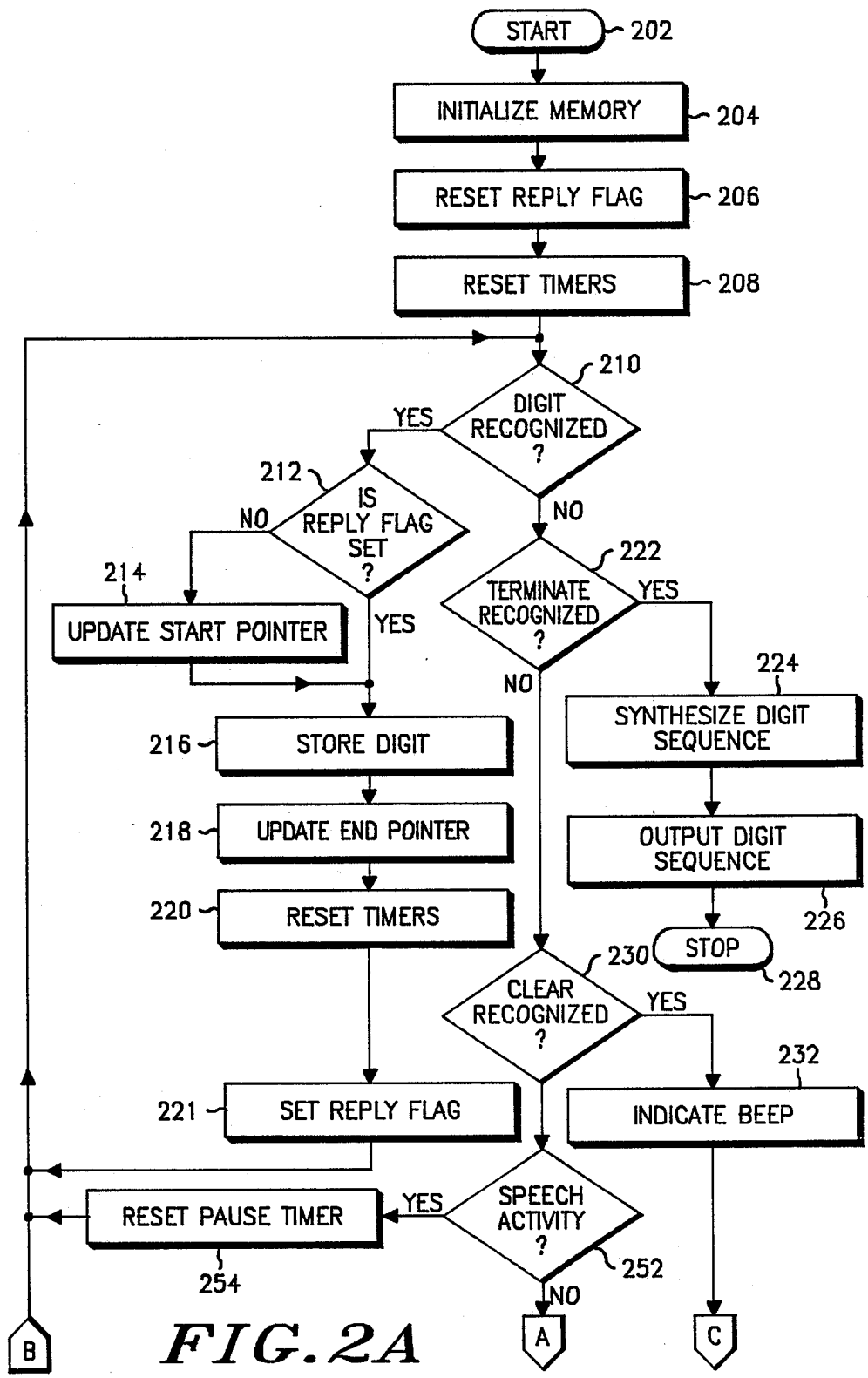
FIGS. 2a and 2b represent a flowchart illustrating the specific sequence of operations performed by the control system in accordance with the practice of the digit entry method of the preferred embodiment.
Figure 2B:
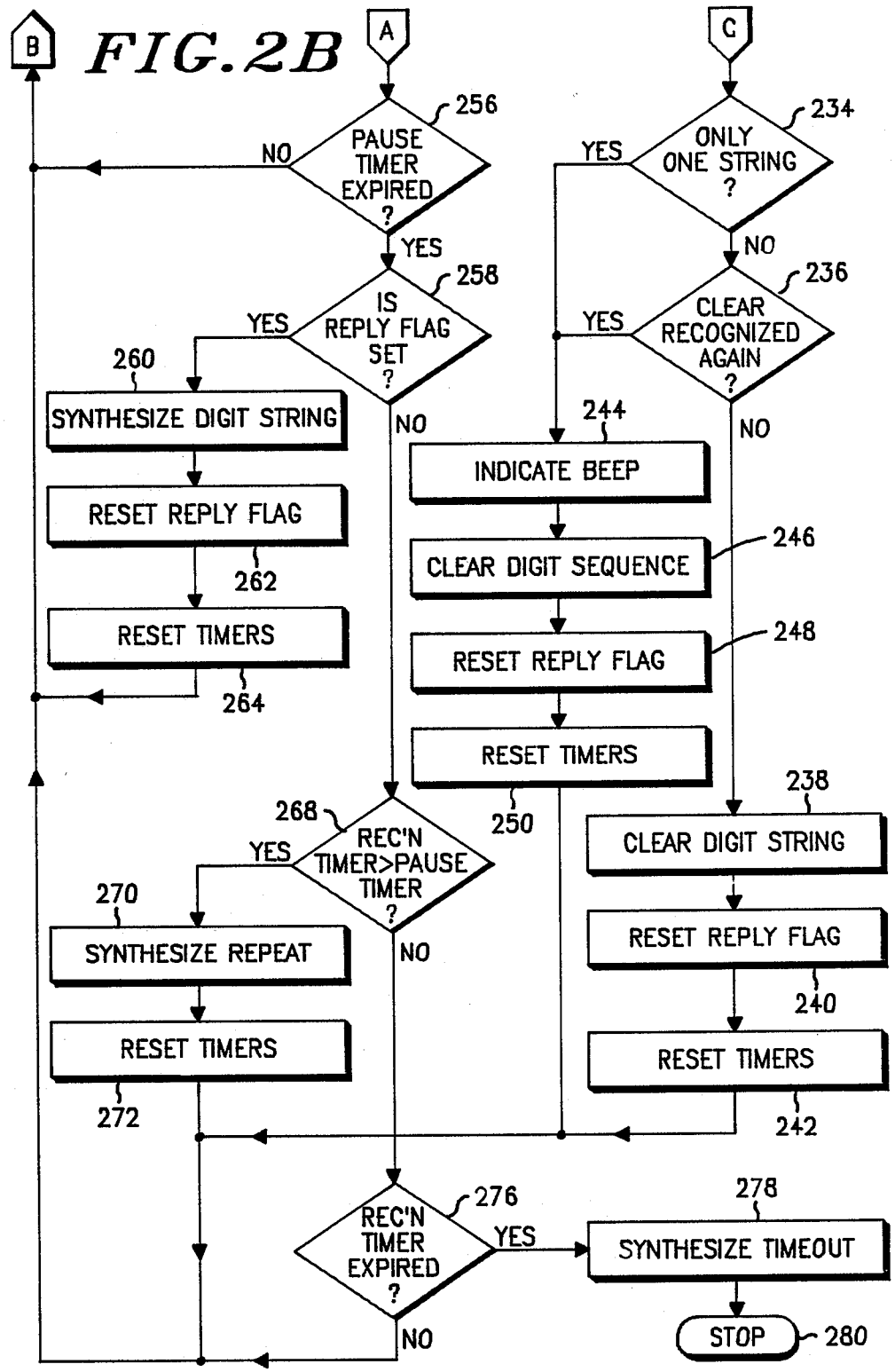

FIGS. 2a and 2b describe the sequence of steps performed by control system 100 during the digit sequence entry procedure. In the preferred embodiment, the controller dialing sequence starts with step 202 upon recognition of the command word ENTER. To initialize the memory locations of controller memory 134 in step 204, the start pointer SP and the end pointer EP are initialized to memory location ZERO. A reply flag is reset in step 206, and both the pause timer and the recognition timer of timers block 124 are reset to zero in step 208.

In step 210, the controller tests whether the speech recognizer has recognized any keyword corresponding to a single digit 0 through 9. If a single digit has been recognized, the reply flag is tested in step 212. If the reply flag has previously been set, then at least one digit which has not yet been replied to the user previous digit has been stored Hence, the start pointer SP, which indicates the memory location of the first stored digit in a particular digit string should not be adjusted If however the reply flag not been set, then the current digit recognized represents the first digit of a string. In that case, step 214 updates the start pointer SP to the memory location corresponding to where the current digit will be stored.

In step 216, the recognized digit is stored in the controller memory 134 at the memory location corresponding to the end pointer EP. The end pointer EP is then incremented in step 218 to point to the next available memory location Both timers are then reset in step 220. The reply flag is set in step 221, since a digit has now been stored. Control then returns to step 210 to wait for the next digit to be recognized If no digit keyword was recognized in step 210, control proceeds to step 222 to check whether the stop command keyword has been recognized. In the preferred embodiment, the word TERMINATE has been chosen as the command keyword used to represent the end of the digit entry procedure. If TERMINATE was recognized, then the complete digit sequence is replied by speech synthesizer 130 in step 224. The digit sequence to be synthesized is obtained by reading memory 134, beginning at memory location ZERO and ending at the memory location EP-1. Next, this complete digit sequence is output in step 226 to speech communications device 140. The digit entry procedure ends at step 228.

Note that no digit editing procedure will be performed after the TERMINATE command is recognized Only the confirmation of the digit sequence by speech synthesis is given, and the entire digit sequences remains in the visual display For example, if the user utters the complete digit sequence immediately followed by the word TERMINATE, the system assumes the recognized sequence is correct. This entry mode would be used when the recognition accuracy is expected to be high. However, this does not mean that errors cannot be corrected after step 228, for the user may desire to correct any errors by restarting the digit entry procedure at step 202. More importantly, the user always has the option of correcting the digit string just entered by inserting a pause before the word TERMINATE. Hence, the user has the flexibility to interactively use the correction procedure, or to quickly enter and confirm a keyword sequence.

If the command keyword TERMINATE is not recognized in step 222, the controller checks to see if the command keyword CLEAR is recognized in step 230. If the CLEAR command is recognized, an audio reply signal is output by the speech synthesizer in step 232. In the preferred embodiment, the speech synthesizer is instructed to generate a single "BEEP" tone. However, numerous other confirmation signals may be chosen. In step 234, the controller tests to see if zero or one digit string has been entered, by checking if the start pointer SP is zero. If only one string was entered, then clearing the single string is the equivalent of clearing the entire digit sequence. Hence, a second BEEP tone is indicated in step 244 to inform the user that the entire sequence, rather than just the last string, has been cleared. If no digit strings were entered, the test in step 234 would also result in transfer to step 244, since the start pointer SP would still be zero. If more than one string has been entered, the controller checks to see if this was the second time a consecutive CLEAR command keyword is recognized in step 236, which means that the user desires to clear the entire sequence. The second consecutive CLEAR may readily be determined by checking if the start pointer SP is equal to the end pointer EP. If a second consecutive CLEAR keyword was recognized, the controller again proceeds to step 244 to output a second BEEP tone by the speech synthesizer The first time a CLEAR command is recognized, and if more than one string has been entered, control proceeds to step 238 to clear only the last-entered digit string. In terms of the memory pointers, the digit string is cleared by setting the end pointer EP equal to the location of the start pointer SP. The reply flag is reset in step 240, since no digit strings now remain which have not been replied. Step 242 resets the timers, and control then returns to recognize the next digit at step 210.

As mentioned above, if only one string has been entered, or if two consecutive CLEAR commands have been recognized, then a second BEEP tone is output in step 244. The entire digit sequence is then cleared in step 246. To clear the digit sequence, the start pointer SP and the end pointer EP are both set equal to memory location ZERO as was done in step 204. Step 248 resets the reply flag, since there are no digit strings remaining in memory. Step 250 resets the timers Control again returns to look for the next keyword in step 210.

If no digit keyword is recognized in step 210, TERMINATE is not recognized in step 222, and CLEAR is not recognized in step 230, then control proceeds to step 252 to check the activity line 116 from speech activity detector 114. If there is speech activity, then only the pause timer is reset in step 254, and control returns to look for the next digit in step 210.

On the contrary, if there is no speech activity, then the pause timer is checked in step 256 to see if it has expired. In the preferred embodiment, the pause timer will expire after three seconds of no speech activity. If the pause timer has not expired, control again returns to step 210. However, if a three second pause is detected, then the reply flag is tested in step 258 to see whether or not a digit string should be replied. If the reply flag has previously been set in step 221, then step 258 routes control to step 260 where the last-entered digit string is replied to the user via speech synthesis. Again, in terms of the memory pointers, the last-entered digit string would begin at memory location SP, and continue to memory location EP-1. The reply flag is reset in step 262 and the timers are reset in step 264, before control is again passed to step 210.

If the reply flag has not been set, meaning that no digits have been recognized which have not yet been replied, then the recognition timer is tested in step 268.

The recognition timer is used to see whether or not speech activity has occurred which has not been recognized. Step 268 simply tests whether or not the recognition timer is greater than the pause timer. Since both timers are always reset together except in step 254, wherein speech activity is occurring without recognition, then it becomes appropriate to compare the recognition timer to the pause timer. Since the pause timer has expired, the pause timer value at step 268 would be exactly three seconds. This indicates that three seconds have lapsed since the last speech activity. If more than three seconds have occurred since a keyword was recognized, then the recognition timer will exceed the pause timer For example, if the user speaks for 2 seconds, then pauses for 3 seconds, but nothing was recognized—then the recognition timer would have a value of at least 5 seconds, while the pause timer would be at 3 seconds. In this case, control would proceed to step 270 wherein the synthesizer is directed to reply the word REPEAT to the user. Both timers are reset in step 272, and control then returns to digit recognition step 210.

If, however, the timers are equal at step 268, then no speech activity has occurred for more than 3 seconds. In this case, control proceeds to step 276 wherein the recognition timer is tested. In the preferred embodiment, the recognition timer will expire after 6 seconds of no speech recognition. If this is the case, then the synthesizer is directed to reply the word TIMEOUT in step 278 to inform the user that the digit entry procedure has ended at step 280. If the recognition timer has not yet expired, then the controller again returns to continue monitoring speech activity at step 210.

In review, it can now be seen that the present invention provides a highly interactive and user-friendly method for entering and verifying a sequence of keywords by voice command. As described above, the control system allows the user much flexibility in entering variable-length strings of digits, and in controlling the verification process by selectively pausing between the digit strings. If high recognition accuracy is expected, the user can quickly enter the entire digit sequence without pauses. Alternatively, under conditions where recognition accuracy is degraded, the user has the option of requesting verification on partial-sequence digit strings by pausing after any number of digits are spoken.

While specific embodiments of the present invention have been shown and described herein, further modifications and improvements may be made by those skilled in the art. In particular, it should be noted that the command words CLEAR and TERMINATE, or the reply words BEEP, REPEAT, and TIMEOUT, were chosen in the preferred embodiment only as representative English words for a particular application However, other command words and reply words may be chosen if desired, especially for use with different languages. Numerous hardware and software modifications may also be performed to customize the present keyword entry method for various other applications. All such modifications which retain the basic underlying principles disclosed and claimed herein are within the scope of this invention.

What is claimed is:

1. A user-interactive method of controlling an electronic device comprising:

recognizing keywords contained in at least two variable-length speech utterance string separated by a pause time interval, providing a pause signal after an utterance string has ceased for a predetermined pause time;

providing an indication to the user, in response to said pause signal, of particular keywords, recognized which correspond to an utterance string occurring before said pause signal; and correcting particular keywords in response to said pause signal and in response to the recognition of a predetermined error command keyword contained in an utterance string occurring after said pause signal.

2. The method according to claim 1, wherein said recognizing step includes the step of storing particular recognized keywords into memory.

3. The method according to claim 2, wherein said indication providing step includes the step of reading said stored keywords from memory 4. The method according to claim 1, wherein said correcting step includes the step of providing an indication to the user of the recognition of said predetermined error command keyword.

5. The method according to claim 2, wherein said correcting step includes the step of clearing stored keywords from memory which correspond to only the last utterance string occurring before said pause signal, in response to the recognition of said predetermined error command keyword.

6. The method according to claim 2, wherein said correcting step further includes the steps of:

recognizing two identical error command keywords contained in consecutive utterance strings; and clearing all keywords stored in memory in response to such recognition.

7. The method according to claim 2, further comprising the steps of:

recognizing a predetermined stop command keyword contained in an utterance string; and outputting all keywords stored in memory in response to such recognition.

8. The method according to claim 1, wherein said indication providing step further includes the step of providing an indication to the user of the occurrence of a speech utterance without any corresponding keyword recognition.

9. The method according to claim 1, wherein said predetermined pause time is not greater than five seconds.

10. A user-interactive speech recognition control apparatus comprising:

means for recognizing keywords contained in at least two variable-length speech utterance strings separated by a pause time interval;

means for providing a pause signal after an utterance string has ceased for a predetermined pause time;

means, responsive to said pause signal, for providing an indication to the user of particular keywords recognized which correspond to the last utterance string occurring before said pause signal; and means, further responsive to said pause signal, for correcting said particular keywords in response to the recognition of a predetermined error command keyword contained in the next utterance string occurring after said pause signal 11. The apparatus according to claim 10, wherein said control apparatus is an automatic dialer for a telecommunications device.

12. The apparatus according to claim 11, wherein said telecommunications device is a radiotelephone.

13. The apparatus according to claim 11, wherein said telecommunications device includes a speakerphone.

14. The apparatus according to claim 10, wherein said recognizing means implements continuous-word speech recognition.

15. The apparatus according to claim 10, wherein said recognizing means includes means for storing particular recognized keywords into memory.

16. The apparatus according to claim 15, wherein said indication providing means includes means for reading said stored keywords from memory.

17. The apparatus according to claim 10, wherein said indication providing means includes a speech synthesizer.

18. The apparatus according to claim 10, wherein said indication providing means includes a visual display.

19. The apparatus according to claim 10, wherein said predetermined pause time is not greater than five seconds.

20. The apparatus according to claim 10, wherein said correcting means includes means for providing an indication to the user of the recognition of said predetermined error command keyword.

21. The apparatus according to claim 15, wherein said correcting means further includes means for clearing stored keywords from memory which correspond to only the last utterance string occurring before said pause signal, in response to the recognition of said predetermined error command keyword.

22. The apparatus according to claim 15, wherein said correcting means further includes:

means for recognizing two identical error command keywords contained in consecutive utterance strings; and means for clearing all keywords stored in memory in response to such recognition.

23. The apparatus according to claim 10, wherein said indication providing means further includes means for providing an indication to the user of the occurrence of a speech utterance without any corresponding keyword recognition.

24. The apparatus according to claim 15, further comprising:

means for recognizing a predetermined stop command keyword contained in an utterance string; and means for outputting all keywords stored in memory in response to such recognition.

25. A method of entering a complete sequence of speech utterances comprised of a plurality of variable-length utterance strings into a speech recognition controller which provides a data output corresponding to keywords contained in said complete sequence, each utterance string followed by a pause time interval, and each utterance string containing at least one keyword, said method comprising the steps of:

(a) recognizing a first utterance string as corresponding to a first keyword set;

(b) storing said first recognized keyword set into read/write memory;

(c) providing a pause signal after said first utterance string has ceased for a predetermined pause time interval;

(d) retrieving said first stored keyword set from memory in response to said pause signal;

(e) providing an indication to the user of at least said first retrieved keyword set;

(f) recognizing a second utterance string as corresponding to a predetermined error command keyword; and (g) correcting said first stored keyword set in response to the recognition of said predetermined error command keyword.

26. The method according to claim 25, wherein said recognizing steps implement continuous-word speech recognition.

27. The method according to claim 25, wherein said indication providing step includes the step of synthesizing speech corresponding to only said first keyword set.

28. The method according to claim 25, wherein said indication providing step further includes the step of visually displaying all stored keywords.

29. The method according to claim 25, wherein said predetermined pause time is not greater than five seconds.

30. The method according to claim 25, wherein said correcting step further includes the step of providing an indication to the user of the recognition of said predetermined error command keyword.

31. The method according to claim 25, wherein said correcting step further includes the step of clearing only said first stored keyword set from memory in response to the recognition of said predetermined error command keyword.

32. The method according to claim 25, wherein said correcting step further includes the steps of:
recognizing two identical error command keywords contained in consecutive utterance strings; and
clearing all keywords stored in memory in response to such recognition.

33. The method according to claim 25, further comprising the steps of:
recognizing a predetermined stop command keyword contained in an utterance string; and outputting all keywords stored in memory in response to such recognition.

34. The method according to claim 25, wherein said indication providing step further includes the step of providing an indication to the user of the occurrence of a speech utterance without any corresponding keyword recognition.

* * * * *

UNITED STATES PATENT AND TRADEMARK OFFICE
CERTIFICATE OF CORRECTION

PATENT NO. : 4,870,686
DATED : Sep. 26, 1989
INVENTOR(S) : Ira A. Gerson, Brett L. Lindsley It is certified that error appears in the above-identified patent and that said Letters Patent is hereby corrected as shown below:

Col. 11, line 2, "string" should be --strings--.

Signed and Sealed this

Fifth Day of February, 1991

Attest:

HARRY F. MANBECK, JR.

*Attesting Officer*   *Commissioner of Patents and Trademarks*